United States Patent
Jeon et al.

(10) Patent No.: US 6,729,737 B2
(45) Date of Patent: May 4, 2004

(54) BACKLIGHT DEVICE FOR LIQUID CRYSTAL DISPLAY DEVICES

(75) Inventors: Seong-Man Jeon, Seoul (KR); Je-Hong Kim, Goyang-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/173,675

(22) Filed: Jun. 19, 2002

(65) Prior Publication Data

US 2003/0081402 A1 May 1, 2003

(30) Foreign Application Priority Data

Oct. 30, 2001 (KR) .................................. 2001-67193

(51) Int. Cl.⁷ ................................................ F21V 7/04
(52) U.S. Cl. ........................ 362/31; 362/339; 362/561
(58) Field of Search .......................... 362/31, 26, 331, 362/330, 339, 561; 349/65, 70

(56) References Cited

U.S. PATENT DOCUMENTS

| | | | | |
|---|---|---|---|---|
| 6,048,071 A | * | 4/2000 | Sawayama | 362/31 |
| 6,086,212 A | * | 7/2000 | Onishi et al. | 362/31 |
| 6,118,503 A | * | 9/2000 | Oki et al. | 349/65 |
| 6,124,906 A | * | 9/2000 | Kawada et al. | 349/65 |
| 6,344,886 B2 | * | 2/2002 | Oki et al. | 349/65 |
| 2002/0030982 A1 | * | 3/2002 | Ha | 362/31 |
| 2002/0181225 A1 | * | 12/2002 | Matsushita | 362/31 |

* cited by examiner

*Primary Examiner*—Sandra O'Shea
*Assistant Examiner*—John Anthony Ward
(74) *Attorney, Agent, or Firm*—McKenna Long & Aldridge LLP

(57) ABSTRACT

The present invention discloses a backlight device for a liquid crystal display device, which includes at least a lamp; at least a lamp housing surrounding the lamp and having an opening on a side; at least a light guide plate connected to the opening of the lamp housing, the light guide plate guiding light from the lamp; a reflector arranged on the rear surface of the light guide plate, the reflector reflecting the light from the lamp in a direction to the light guide plate; a pre-collimator disposed in the lamp housing between the lamp and the light guide plate; a diffusion sheet disposed on the front surface of the light guide plate; and a prism sheet disposed on the diffusion sheet.

22 Claims, 7 Drawing Sheets

BACKLIGHT DEVICE FOR LIQUID CRYSTAL DISPLAY DEVICES

The present invention claims the benefit of Korean Patent Application No. 2001-67193, filed in Korea on Oct. 30, 2001, which is hereby incorporated by reference for all purposes as if fully set forth herein.

BACKGROUND OF THE INVENTION

1. Field of the Invention

The present invention relates to a liquid crystal display (LCD) device and more particularly to a backlight device for use in the LCD device.

2. Discussion of the Related Art

In general, since flat panel display devices are thin, low weight, and have low power consumption, they are increasingly being used for displays of portable devices. Among the various types of flat panel display devices, liquid crystal display (LCD) devices are widely used for laptop computers and desktop monitors because of their superiority in resolution, color image display, and display quality.

LCD devices use the optical anisotropy and polarization properties of liquid crystal molecules to produce a predetermined image. Liquid crystal molecules have a definite orientation that results from their peculiar characteristics. The specific orientation can be modified by an electric field that is applied across the liquid crystal molecules. In other words, electric fields applied across the liquid crystal molecules can change the orientation of the liquid crystal molecules. Due to optical anisotropy, incident light is refracted according to the orientation of the liquid crystal molecules.

Specifically, the LCD devices have upper and lower substrates with electrodes that are spaced apart and face each other, and a liquid crystal material is interposed therebetween. Accordingly, when a voltage is applied to the liquid crystal material by the electrodes of each substrate, an alignment direction of the liquid crystal molecules is changed in accordance with the applied voltage to display images. By controlling the applied voltage, the LCD device provides various transmittances for rays of light to display image data.

The LCD device, however, does not emit the light by itself, and it only controls the light transmissivity. Therefore, the LCD device needs a light source additionally. As a light source, LCD devices often use backlight devices behind the LCD panel. The backlight devices are classified into direct back light type (or direct type) units and edge light type (or edge type) units, according to a position of a lamp. In the case where the direct type back light unit is used for a liquid crystal display device, incident rays irradiating from the lamp are directly incident to the LCD panel. In the case where the edge type back light unit is used, rays from the lamp are incident to the LCD panel via a light guide or a reflector. A detailed explanation of the edge type backlight will be provided subsequently.

FIG. 1 shows a conventional edge type backlight device for use in a LCD device. The conventional edge type backlight device includes a lamp 11, a U-shaped lamp housing 12 surrounding the lamp 11, a light guide plate 13, and a reflector 14. The light guide plate 13 coverts the light from the lamp into surface light and includes dot patterns (not shown) on the bottom thereof. The dot patterns (not shown) are formed, e.g., by printing of paint. The light guide plate 13 including the dot patterns diffuses light from the lamp in order to form the uniform surface light. The reflector 14 is disposed in the back side of the light guide plate 13, and serves to reflect the rays from the light such that light leakage is prevented. A first diffusion sheet 15, first and second prism sheets 16 and 17, and a second diffusion sheet 18 are sequentially formed on the front surface of the light guide plate 13.

FIG. 2 is a schematic perspective illustration of the first and second prism sheets 16 and 17 of FIG. 1. Each of the prism sheets 16 and 17 includes a plurality of triangular prisms 16a and 17a on the front surface thereof. The first triangular prisms 16a of the first prism sheet 16 is arranged perpendicular to the second triangular prisms 17a of the second prism sheet 17.

When the light guide plate 13 (in FIG. 1) includes the dot patterns printed by paint (i.e., a printing-type light guide plate), the backlight device preferably has more than two prism sheets which include perpendicular triangular prisms, respectively. However, as the number of prism sheets increases, total internal reflection frequently occurs in the angular prisms, thereby causing the optical transmission losses. Since the printing-type light guide plate utilizes light diffusion, it is very difficult to control the direction of the rays. Accordingly, prismatic patterns are widely used, on the bottom of the light guide plate instead of the dot patterns, as shown in FIG. 3. The prismatic patterns are formed by a non-printing method, such as an etching method.

FIG. 3 shows a conventional backlight device having a plurality of prismatic patterns. As shown, the conventional backlight device includes a lamp 21, a U-shaped lamp housing 22 surrounding the lamp 21, a light guide plate 23, and a reflector 24. The light guide plate 23 is thinner, further from the lamp 21. The light guide plate 23 includes a plurality of prismatic patterns 23a on the bottom thereof, which is formed by etching. The reflector 24 is disposed in the back side of the light guide plate 23, and serves as reflecting the rays from the lamp 21 such that light leakage is prevented. A diffusion sheet 25 and a prism sheet 26 are sequentially formed on the front surface of the light guide plate 23.

FIG. 4 is a simulation result showing viewing angle-dependence of luminance in cases of using the conventional backlight device of FIG. 3. The dotted line of the graph in FIG. 4 is a guide line that is expressed by cosine function. The guide line represents possible viewing angle distribution of the outgoing light from the backlight device. The line comprising an alternate sequence of long and short dashes indicates an up-and-down viewing angle distribution of the outgoing light from the backlight device of FIG. 3, while the full line indicates a right-and-left viewing angle distribution. As shown, the outgoing light from the backlight device distributes ranging from −30 to +30 degrees. When the viewing angle is zero, the intensity of the outgoing light is maximized.

Accordingly, since the backlight device having the prismatic patterns 23a of FIG. 3 can control the direction of the light from the lamp 21 using the light refraction, only one prism sheet is applied. As a result, the costs of production are reduced.

Meanwhile, the LCD device generally includes an absorptive color filter layer to display color images. However, when the light passes through the absorptive color filter, portions of the light are absorbed by the absorptive color filter. Thus, the optical loses increases and the luminance of the LCD device decreases. To overcome this problem, cholesteric liquid crystal (CLC) has been researched and developed for use as a color filter. The CLC color filter utilizes the selective reflection characteristics of the cholesteric liquid crystal. The LCD devices having the CLC color filter have great color reproduction and contrast ratio compared to those LCD devices that use an absorptive color filter.

As widely known, the cholesteric liquid crystal (CLC) reflects the light having a certain wavelength in accordance with its helical pitch, i.e., selective reflection characteristics. However, the light travels different distances with respect to the CLC color filter depending on different angles of incidence. Thus, the light passing through the CLC color filter experiences different helical pitches whenever it strikes the CLC color filter at different angles of incidence. As a result, the LCD device produces color shift in accordance with the viewing angles.

SUMMARY OF THE INVENTION

Accordingly, the present invention is directed to a backlight device for a liquid crystal display (LCD) device, which substantially obviates one or more of problems due to limitations and disadvantages of the related art.

An advantage of the present invention is to provide a backlight device for a liquid crystal display device, which has a high light collimating efficiency.

Another advantage of the present invention is to provide a backlight device for a liquid crystal display device, which is produced at relatively low costs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight device for a liquid crystal display device includes at least a lamp; at least a lamp housing surrounding the lamp and having an opening on a side; at least a light guide plate connected to the opening of the lamp housing, the light guide plate guiding light from the lamp; a reflector arranged on the rear surface of the light guide plate, the reflector reflecting the light from the lamp in a direction to the light guide plate; a pre-collimator disposed in the lamp housing between the lamp and the light guide plate; a diffusion sheet disposed on the front surface of the light guide plate; and a prism sheet disposed on the diffusion sheet; wherein the lamp housing has lower and upper portions; and wherein the lower and upper portions have first and second V-shaped grooves in the inner surfaces thereof. The first and second V-shaped grooves correspond and face to each other, so the pre-collimator is fixed into the V-shaped grooves.

In another aspect, a backlight device for a liquid crystal display device includes at least a lamp; at least a lamp housing surrounding the lamp and having an opening on a side; at least a light guide plate connected to the opening of the lamp housing, the light guide plate guiding light from the lamp; a reflector arranged on the rear surface of the light guide plate, the reflector reflecting the light from the lamp in a direction to the light guide plate; a pre-collimator disposed in the lamp housing between the lamp and the light guide plate; a diffusion sheet disposed on the front surface of the light guide plate; and a prism sheet disposed on the diffusion sheet; wherein the lamp housing has lower and upper portions; and wherein the lower portion has a V-shaped groove in the inner surfaces thereof and the upper portion has a hole covered by a hole cover. The V-shaped groove of the lower portion corresponds and faces to the hole of the upper portion, and thus, the pre-collimator is inserted through the hole of the upper portion and fixed into the V-shaped groove of the lower portion. The hole cover is a silver (Ag) coated tape.

In another aspect, a backlight device for a liquid crystal display device includes at least a lamp; at least a lamp housing surrounding the lamp and having an opening on a side; at least a light guide plate connected to the opening of the lamp housing, the light guide plate guiding light from the lamp; a reflector arranged on the rear surface of the light guide plate, the reflector reflecting the light from the lamp in a direction to the light guide plate; a pre-collimator disposed in the lamp housing between the lamp and the light guide plate; a diffusion sheet disposed on the front surface of the light guide plate; and a prism sheet disposed on the diffusion sheet; wherein the lamp housing has lower and upper portions; and wherein the lower and upper portions have Z-bands each having a step. The Z-bends allows the lamp housing to have inner and outer widths between the lower and upper portions. The outer width is larger than the inner width by 400 to 600 micrometers. The pre-collimator is disposed at the Z-bends of the upper and lower portions of the lamp housing. The light guide plate and the reflector are attached to the pre-collimator to fix the pre-collimator. The step of Z-bends ranges from 200 to 300 micrometers.

With respect to the above-mentioned backlight device, the lamp housing has a U shape. The pre-collimator is formed of prism sheet that has a plurality of angular prism. The light guide plate includes a plurality of prismatic patterns at the bottom.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 5A:
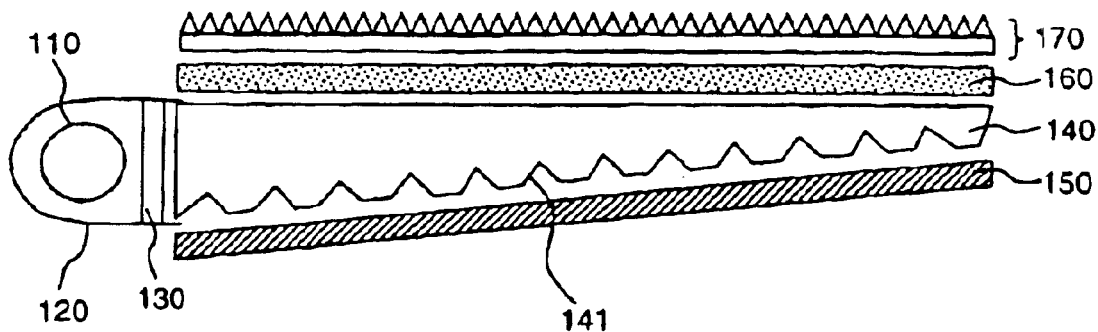
FIG. 5A shows a first embodiment of a backlight device for use in a liquid crystal display device according to the present invention.

FIG. 5A shows a backlight device for use in a liquid crystal display device according to the present invention. As shown, the backlight device of the present invention includes a lamp 110, a U-shaped lamp housing 120 surrounding the lamp 110, a pre-collimator 130, a light guide plate 140, and a reflector 150. The U-shaped lamp housing 120 has an opening facing to the light guide plate 140. The light guide plate 140 includes a plurality of prismatic patterns 141 on the bottom thereof, which may be formed by etching.

Figure 6:
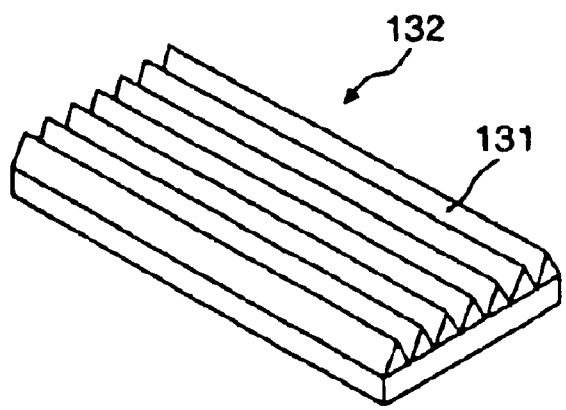
FIG. 6 is a schematic perspective view of a pre-collimator of FIG. 5A and FIG. 5B.

The pre-collimator 130 is disposed at the opening of the U-shaped lamp housing 120 on the border to the light guide plate 140. As illustrated in FIG. 6, the pre-collimator 130 is formed of a prism sheet 132 including a plurality of triangular prisms 131. The pre-collimator 130 collimates the light emitted from the lamp 110 and then transmits that light to the prismatic patterns 141 of the light guide plate 140, thereby achieving a high light collimating efficiency.

The reflector 150 is disposed on the back side of the light guide plate 140 adjacent to the prismatic patterns 141, and serves to reflect the rays from the lamp 110 such that light leakage is prevented. A diffusion sheet 160 and a prism sheet 170 are sequentially formed on the front surface of the light guide plate 140.

Figure 5B:
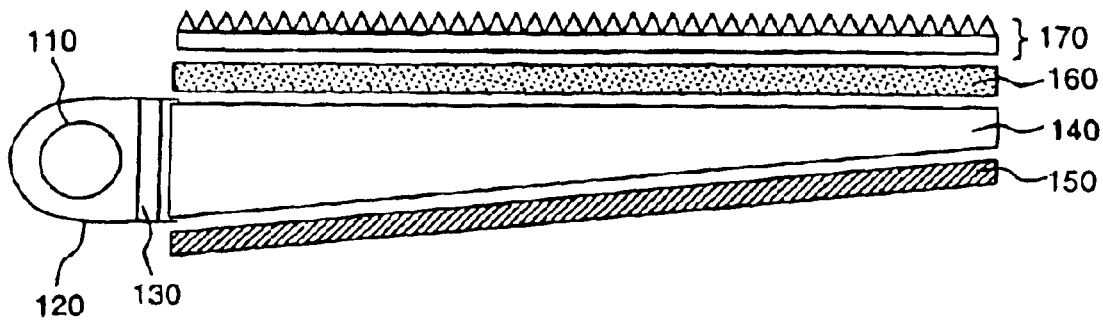
FIG. 5B shows a second embodiment of a backlight device for use in a liquid crystal display device according to the present invention.

FIG. 5B illustrates another embodiment of the present invention in which the light guide plate 140 includes a micro pattern prism on its bottom edge.

The lamp 110 is usually a cold cathode fluorescent lamp (CCFL), a heat cathode fluorescent lamp (HCFL), or the like. The lamp 110 can be a direct back light unit or an edge light unit. A direct back light source generally reflects light from a light source onto the back surface of a liquid crystal panel using a reflective plate. However, the direct back light has some problems, such as being relatively thick, consuming significant power, and having a high unit cost. An edge light unit device receives light through one side of a shaped light guide comprised of a transparent acryl resin or the like. The edge light unit directs the received light to a light outputting surface of the light guide plate that then illuminates the back of a liquid crystal panel. In order to improve light efficiency, an optical reflective plate, or an optical reflective film, is often provided on the opposite side of the light output surface of the light guide plate. As shown in FIGS. 5A and 5B, a CCFL (cold cathode fluorescent lamp) is usually used with edge light units because the CCFL is thin, lightweight, and consumes little power, and thus is highly suitable for portable computers.

The U-shaped lamp housing 120 reflects and condenses the output light from the lamp 120 in order to allow all the light to be directed to the opening of the U-shaped lamp housing 120. Therefore, the U-shaped lamp housing 120 prevents the light leakage and makes all the light pass through the pre-collimator 130.

The light guide plate 140 converts the light emitted from the lamp 110 into the surface light and allows the light to be directed upward (i.e., a first direction). The bottom surface of the light guide plate 140 is inclined, such that the light guide plate 140 is thinner further from the lamp 110. However, unlike the light guide plate 140 shown in FIGS. 5A and 5B, the light guide plate 140 can have a uniform thickness. The prismatic patterns 141 at the bottom of the light guide plate 140 may be formed by an etching method, and serves as a reflector that deflects the light from the pro-collimator 130 in the first direction. The reflector 150 turns the light directed downward (i.e., a second direction) to face the first direction. So the reflector 150 prevents the light leakage in the second direction. As a result, uniformity of brightness of the LCD device is ensured and a satisfactory display quality is realized.

Figure 1:
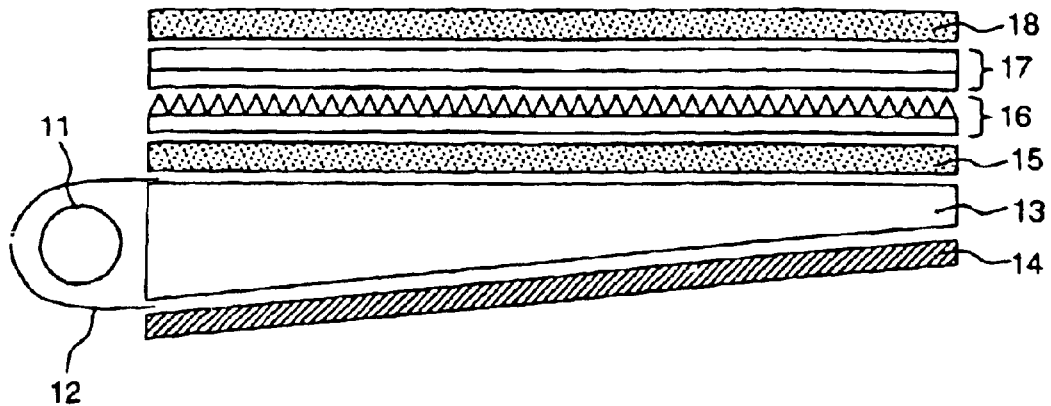
FIG. 1 shows a conventional edge type backlight device for use in a liquid crystal display device.
Figure 2:
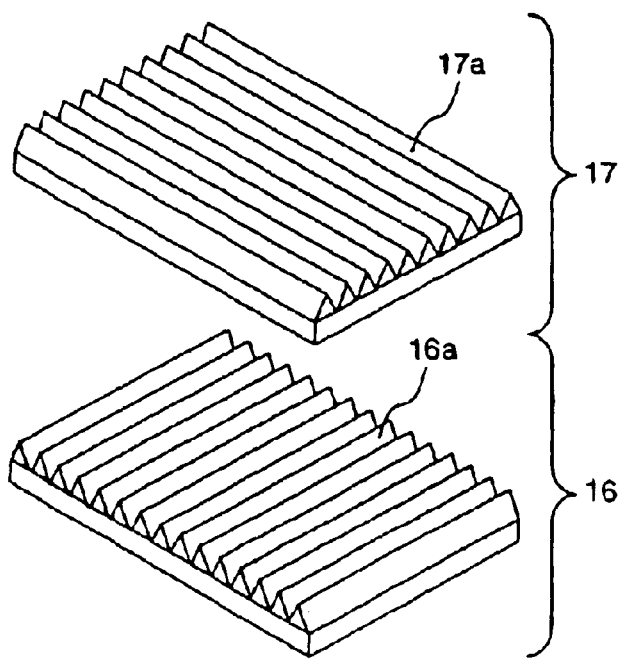
FIG. 2 is a schematic perspective illustration of the first and second prism sheets of FIG. 1.
Figure 3:
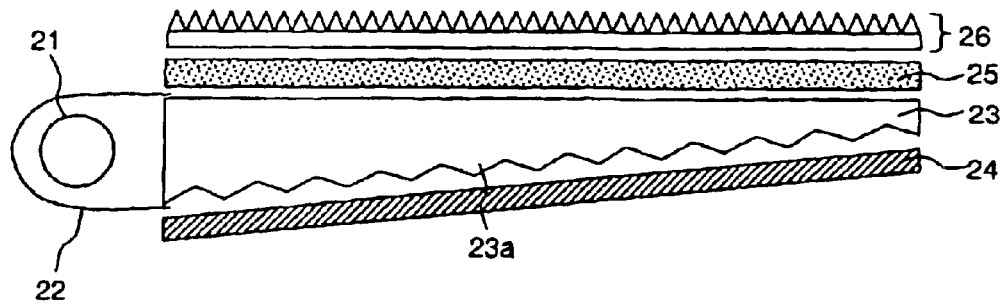
FIG. 3 shows a conventional backlight device having a plurality of prismatic patterns.
Figure 4:
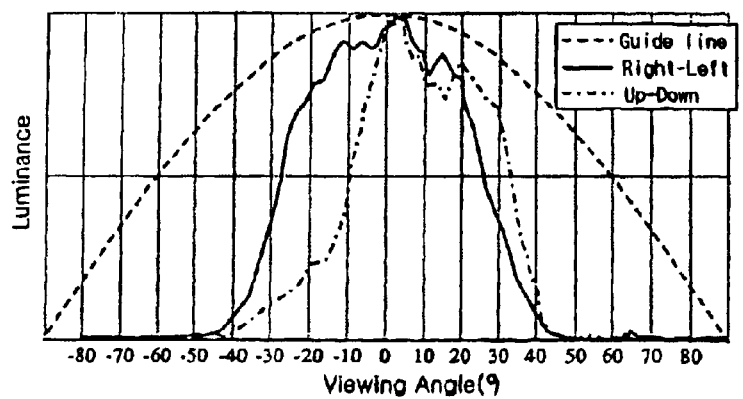
FIG. 4 is a simulation result showing viewing angle-dependence of luminance in cases of using the conventional backlight device of FIG. 3.
Figure 7:
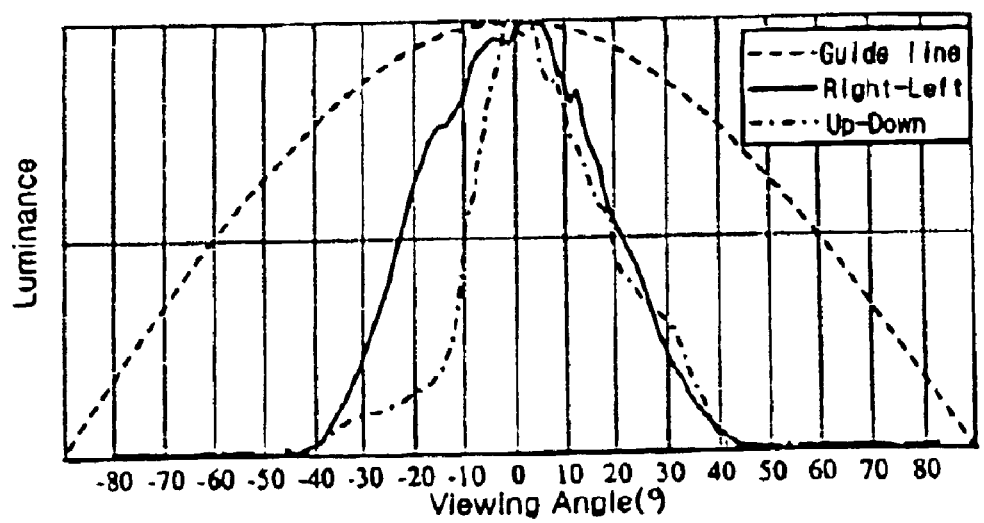
FIG. 7 is a simulation result showing viewing angle-dependence of luminance in cases of using the inventive backlight device of FIG. 5.

FIG. 7 is a simulation result showing viewing angle-dependence of luminance in cases of using the inventive backlight devices of FIGS. 5A and 5B. The dotted line of the graph in FIG. 7 is a guideline that is expressed by cosine function. The guideline represents possible viewing angle distribution of the outgoing light from the backlight device. The line comprising an alternate sequence of long and short dashes indicates an up-and-down viewing angle distribution of the outgoing light from the backlight device of FIGS. 5A and 5B, while the full line indicates a right-and-left viewing angle distribution. As shown, the output light from the backlight device distributes ranging from −25 to +25 degrees, and the intensity of the outgoing light is maximized when the viewing angle is zero. In view of the up-and-down viewing angle distribution, it shows the symmetrical distribution with respect to the zero (0°) viewing angle, compared to the up-and-down angle of FIG. 4 which is asymmetrically distributed. Accordingly, since the pre-collimator is formed at the opening of the U-shaped lamp housing, the light collimation is improved and only one prism sheet can be utilized in the backlight device. As a result, the manufacturing cost is reduced.

When adopting the pre-collimator in the U-shaped lamp housing, there will be a lot of structural applications. What follows are the exemplary layouts of the pre-collimator and U-shaped lamp housing.

Figure 8A:
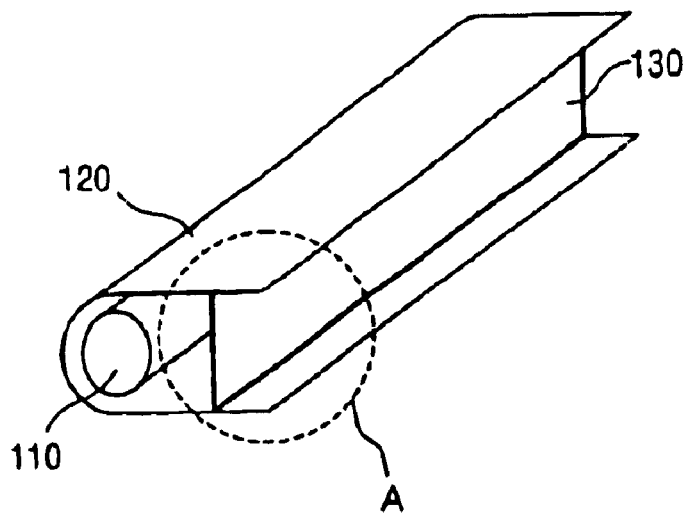
FIG. 8A is a perspective view showing a U-shaped lamp housing according to another embodiment of the present invention.
Figure 8B:
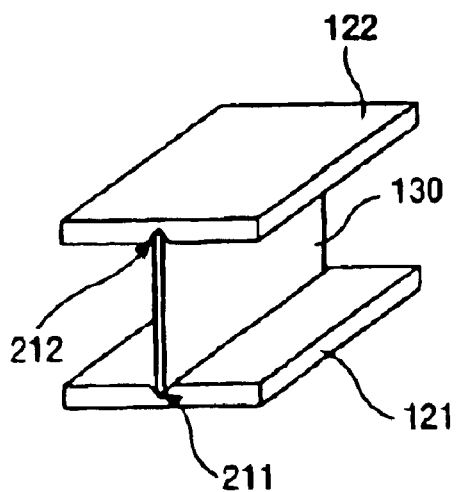
FIG. 8B is an enlarged view illustrating a portion A of FIG. 8A.

FIG. 8A is a perspective view showing a U-shaped lamp housing according to another embodiment of the present invention, and FIG. 8B is an enlarged view illustrating a portion A of FIG. 8A.

In FIG. 8A, the lamp 110 is contained by the U-shaped lamp housing 120 and the pre-collimator 130 is disposed at the opening of the U-shaped lamp housing 120. The U-shaped lamp housing 120 has lower and upper portions 121 and 122, as shown in FIG. 8B. On the inner surfaces of the lower and upper portions 121 and 122, V-shaped grooves 211 and 212 are formed, respectively. The pre-collimator 130 is fixed into the V-shaped grooves 211 and 212 such that it does not shake. The width of the V-shaped grooves 211 and 212 ranges from about 150 to 200 micrometers, and the depth of the V-shaped grooves 211 and 212 ranges from about 50 to 70 micrometers. Meanwhile, UV (ultraviolet light) curing adhesives can be applied in the V-shaped grooves 211 and 212 in order to fasten the pre-collimator 130 to the U-shaped lamp housing 120. When the UV curing adhesives are irradiated by the ultraviolet (UV) rays, they cure for fixation.

When the pre-collimator 130 is applied into the U-shaped lamp housing 120, it is inserted from the side along the V-shaped grooves 211 and 212. However, there are some difficulties in inserting the pre-collimator into the U-shaped lamp housing because the collimator has a width of several hundreds micrometers and a length of several tens centimeters. Thus, the following embodiment is designed and proposed, as shown in FIGS. 9A and 9B.

Figure 9A:
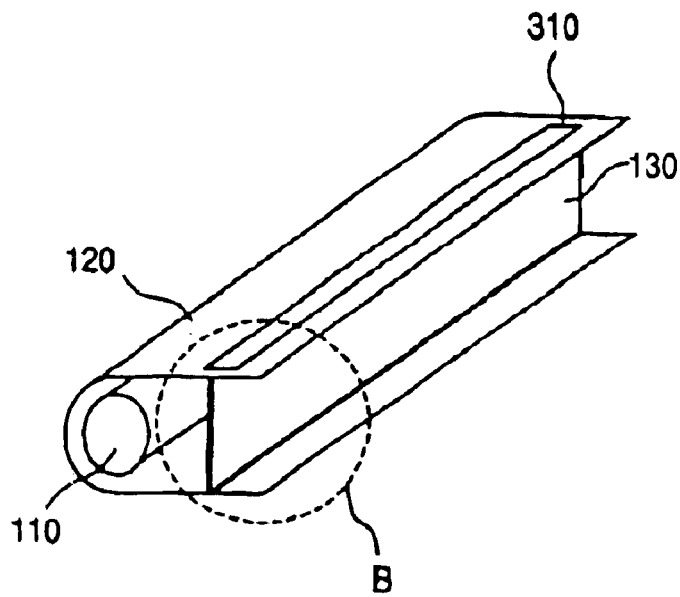
FIG. 9A is a perspective view showing a U-shaped lamp housing according to another embodiment of the present invention.
Figure 9B:
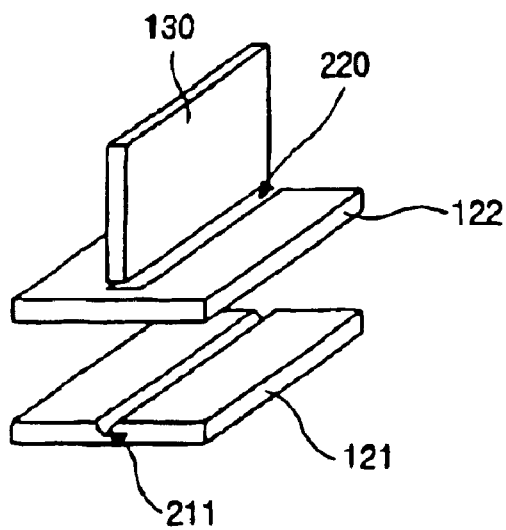
FIG. 9B is an enlarged view of a portion B of FIG. 9A and illustrates a step of inserting a pre-collimator into a U-shaped lamp housing.

FIG. 9A is a perspective view showing a U-shaped lamp housing according to another embodiment of the present invention, and FIG. 9B is an enlarged view a portion B of FIG. 9A and illustrates a step of inserting the pre-collimator into the U-shaped lamp housing.

In FIG. 9A, the lamp 110 is contained by the U-shaped lamp housing 120 and the pre-collimator 130 is disposed at the opening of the U-shaped lamp housing 120. The U-shaped lamp housing 120 has lower and upper portions 121 and 122, as shown in FIG. 9B. A hole cover 310, such as a silver (Ag) coated tape, is disposed on the upper portion 122 of the U-shaped lamp hosing.

Referring to FIG. 9B, the upper portion 122 of the U-shaped lamp housing 120 has a hole 220 therein. The width of the hole 220 is a bit larger than the thickness of the pre-collimator 130, and the length of the hole 220 is also larger than the length of the pre-collimator 130. On the inner surface of the lower portions 121, V-shaped groove 211 is formed. The V-shaped groove 211 and the hole 220 correspond and face to each other. As the pre-collimator 130 is inserted through the hole 220 of the upper portion 122, it is fixed into the V-shaped groove 211. As with the first embodiment, the width of the V-shaped groove 211 ranges from about 150 to 200 micrometers, and the depth ranges from about 50 to 70 micrometers. The hole 220 has the width of about 150 to 200 micrometers. As mentioned before, the UV curing adhesives may be applied in the V-shaped groove 211 in order to fasten the pre-collimator 130 to the U-shaped lamp housing 120. The UV curing adhesives are cured by the ultraviolet (UV) rays for fixation. Thereafter, the hole cover 310 is formed on the upper portion 122 of the U-shaped lamp housing 120 to cover the hole 220 and to fasten the pre-collimator 130.

Figure 10A:
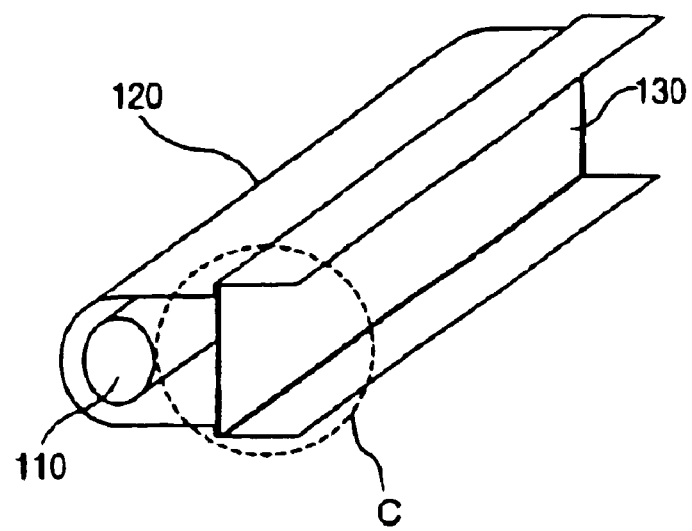
FIG. 10A is a perspective view showing a U-shaped lamp housing according to another embodiment of the present invention.
Figure 10B:
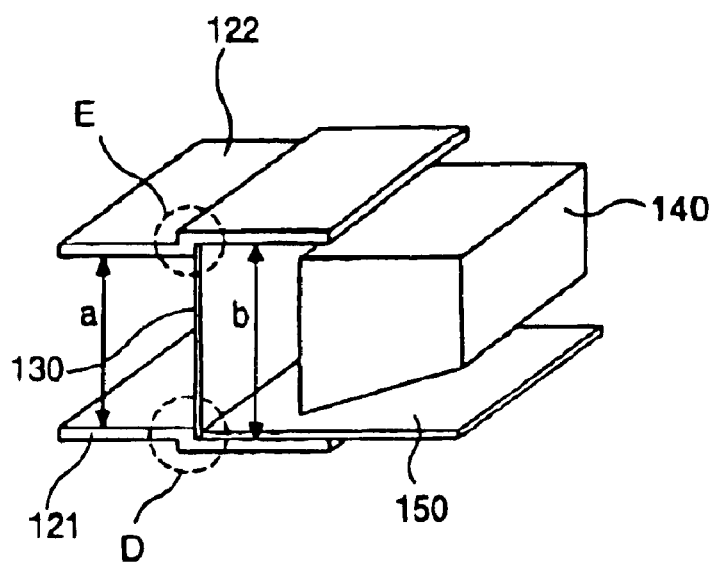
FIG. 10B is an enlarged view illustrating a portion C of FIG. 10A.

FIG. 10A is a perspective view showing a U-shaped lamp housing according to another embodiment of the present invention, and FIG. 10B is an enlarged view illustrating a portion C of FIG. 10A.

In FIG. 10A, the lamp 110 is contained by the U-shaped lamp housing 120 and the pre-collimator 130 is disposed at the opening of the U-shaped lamp housing 120. The U-shaped lamp housing 120 has lower and upper portions 121 and 122, as shown in FIG. 10B. The lower and upper portions 121 and 122 have Z-bends D and E, respectively, and thus the pre-collimator 130 is actually fitted at these Z-bends D and E. Due to the Z-bends D and E, the U-shaped lamp housing 120 has different widths "a" and "b" between the lower and upper portions 121 and 122. The inner width "a" is narrower than the outer width "b." The height of the step surfaces of the Z-bends D and E are about 200 to 300 micrometers each such that the second width "b" is larger than the first width "a" by about 400 to 600 micrometers total.

As illustrated in FIG. 10B, when the pre-collimator 130 is fixed into the U-shaped lamp housing 120, the light guide plate 140 and the reflector 150 are attached to the pre-collimator 130 at the opening having the second width "b." The gap between the lamp housing 120 where the pre-collimator 130 is disposed and the light guide plate 140 is indiscernibly small, e.g., less than 1 mm. Therefore, additional fixation means, such as the UV curing adhesives or hole cover, is not required.

According to the present invention, since the pre-collimator is arranged in the U-shaped lamp housing, more than one prism sheet is not required in the backlight device. Thus, the manufacturing costs are reduced. Additionally, since the U-shaped lamp housing has the Z-bends in the lower and upper portions thereof, the manufacturing costs are further reduced because not adhesives, covers, or other fastening means are required.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight device for a liquid crystal display device, comprising:
   at least a lamp;
   at least a lamp housing surrounding the lamp and having an opening on a side;
   at least a light guide plate connected to the opening of the lamp housing, the light guide plate guiding light from the lamp;
   a reflector arranged on the rear surface of the light guide plate, the reflector reflecting the light from the lamp in a direction to the light guide plate;
   a pre-collimator disposed in the lamp housing between the lamp and the light guide plate;
   a diffusion sheet disposed on the front surface of the light guide plate; and
   a prism sheet disposed on the diffusion sheet;
   wherein the lamp housing has lower and upper portions; and
   wherein the lower and upper portions have first and second V-shaped grooves in the inner surfaces thereof.

2. The backlight device according to claim 1, wherein the lamp housing has a U shape.

3. The backlight device according to claim 1, wherein the first and second V-shaped grooves correspond and face to each other.

4. The backlight device according to claim 1, wherein the pre-collimator is fixed into the V-shaped grooves.

5. The backlight device according to claim 1, wherein the pre-collimator is formed of prism sheet that has a plurality of angular prism.

6. The backlight device according to claim 1, wherein the light guide plate includes a plurality of prismatic patterns at the bottom.

7. A backlight device for a liquid crystal display device, comprising:
   at least a lamp;
   at least a lamp housing surrounding the lamp and having an opening on a side;

at least a light guide plate connected to the opening of the lamp housing, the light guide plate guiding light from the lamp;

a reflector arranged on the rear surface of the light guide plate, the reflector reflecting the light from the lamp in a direction to the light guide plate;

a pre-collimator disposed in the lamp housing between the lamp and the light guide plate;

a diffusion sheet disposed on the front surface of the light guide plate; and a prism sheet disposed on the diffusion sheet;

wherein the lamp housing has lower and upper portions; and wherein the lower portion has a V-shaped groove in the inner surfaces thereof and the upper portion has a hole covered by a hole cover.

8. The backlight device according to claim 7, wherein the lamp housing has a U shape.

9. The backlight device according to claim 7, wherein the V-shaped groove of the lower portion corresponds and faces to the hole of the upper portion.

10. The backlight device according to claim 7, wherein the pre-collimator is inserted through the hole of the upper portion and fixed into the V-shaped groove of the lower portion.

11. The backlight device according to claim 7, wherein the hole cover is a silver (Ag) coated tape.

12. The backlight device according to claim 7, wherein the pre-collimator is formed of prism sheet that has a plurality of angular prism.

13. The backlight device according to claim 7, wherein the light guide plate includes a plurality of prismatic patterns at the bottom.

14. A backlight device for a liquid crystal display device, comprising:

at least a lamp;

at least a lamp housing surrounding the lamp and having an opening on a side;

at least a light guide plate connected to the opening of the lamp housing, the light guide plate guiding light from the lamp;

a reflector arranged on the rear surface of the light guide plate, the reflector reflecting the light from the lamp in a direction to the light guide plate;

a pre-collimator disposed in the lamp housing between the lamp and the light guide plate;

a diffusion sheet disposed on the front surface of the light guide plate; and a prism sheet disposed on the diffusion sheet;

wherein the lamp housing has lower and upper portions; and wherein the lower and upper portions have Z-bands each having a step.

15. The backlight device according to claim 14, wherein the lamp housing has a U shape.

16. The backlight device according to claim 14, wherein the Z-bends allows the lamp housing to have inner and outer widths between the lower and upper portions.

17. The backlight device according to claim 16, wherein the outer width is larger than the inner width by 400 to 600 micrometers.

18. The backlight device according to claim 14, wherein the pre-collimator is disposed at the Z-bends of the lower and upper portions of the lamp housing.

19. The backlight device according to claim 14, wherein the light guide plate and the reflector are attached to the pre-collimator to fix the pre-collimator.

20. The backlight device according to claim 14, wherein the step of Z-bends ranges from 200 to 300 micrometers.

21. The backlight device according to claim 14, wherein the pre-collimator is formed of prism sheet that has a plurality of angular prism.

22. The backlight device according to claim 14, wherein the light guide plate includes a plurality of prismatic patterns at the bottom.

* * * * *